(12) United States Patent
Branham

(10) Patent No.: US 10,738,974 B2
(45) Date of Patent: Aug. 11, 2020

(54) SOFTBOX AND COVER ADAPTER FOR LIGHTING DEVICES

(71) Applicant: Michael James Branham, Vancouver (CA)

(72) Inventor: Michael James Branham, Vancouver (CA)

(*) Notice: Subject to any disclaimer, the term of this patent is extended or adjusted under 35 U.S.C. 154(b) by 0 days.

(21) Appl. No.: 16/283,413

(22) Filed: Feb. 22, 2019

(65) Prior Publication Data

US 2019/0346115 A1    Nov. 14, 2019

Related U.S. Application Data

(60) Provisional application No. 62/641,178, filed on Mar. 9, 2018, provisional application No. 62/634,776, filed on Feb. 23, 2018.

(51) Int. Cl.
| | |
|---|---|
| *F21V 15/01* | (2006.01) |
| *G03B 15/02* | (2006.01) |
| *F21V 21/14* | (2006.01) |

(52) U.S. Cl.
CPC .............. *F21V 15/01* (2013.01); *F21V 21/14* (2013.01); *G03B 15/02* (2013.01)

(58) Field of Classification Search
CPC ................................. F21V 15/01; F21V 21/14
USPC .......................................................... 362/368
See application file for complete search history.

(56) References Cited

U.S. PATENT DOCUMENTS

| | | | | |
|---|---|---|---|---|
| 4,446,506 A | * | 5/1984 | Larson ................... | G03B 15/02 362/17 |
| 4,504,888 A | * | 3/1985 | Rosenthal .............. | G03B 15/02 362/17 |
| 4,807,089 A | * | 2/1989 | Nussli .................... | G03B 15/06 362/17 |
| 5,311,409 A | * | 5/1994 | King ..................... | G03B 15/06 362/17 |
| 8,209,912 B2 | * | 7/2012 | Hargreaves .............. | A01G 9/26 52/28 |

* cited by examiner

*Primary Examiner* — Christopher M Raabe
(74) *Attorney, Agent, or Firm* — Stephen R. Burri

(57) ABSTRACT

A lighting device for film and television for attachment to a light fixture has interconnected preferably trapezoidal panels connected to adjacent panels along opposing ends within a fabric sleeve, the wider edges of the panels connectable to the lighting fixture. Each panel has a corrugated plastic core and fibreglass rods inserted perpendicular to the parallel edges of the panels adjacent a first end, adjacent an opposing second end, and at a medial position. A hinge having attachment means is provided at one end of the extension housing. The device may be folded upon itself to about ⅛ of its original size and requires no assembly as it is a single unit. Although the enclosure is collapsible, once it is attached to any light fixture it becomes a rigid frame that does not collapse.

2 Claims, 14 Drawing Sheets

SOFTBOX AND COVER ADAPTER FOR LIGHTING DEVICES

FIELD OF THE INVENTION

The present invention relates to lighting. In particular, the present invention relates to lighting technology in motion picture film making, cinematography and photography.

BACKGROUND OF THE INVENTION

When lighting for motion pictures, it is desirable to modify the light for a given shot to obtain a desired lighting effect which gives the film its "look" or aesthetic. Lighting configurations are used for the filming of images to create a scene in a film, as light is the fundamental agent of imprinting these images on the film or the digital camera sensor and on the viewer's eye. These configurations mostly involve the enhancing, creation, or modification of darkness in various ambient low light conditions, whether artificial or natural shadow in alleyways, or a night street rendered in a large film studio. These configurations also may include the manipulation and enhancement of light derived from a variety of light sources, which may be natural, artificial or a combination of both, such as a large spotlight on an actor playing a role in the Sonora Desert.

A scene in a motion picture is lit by adding, shining, or directing light onto the area that makes up the frame of the scene being filmed, the "shot." It is common to use LED lights. As LED lights are becoming smaller and brighter, they become less well suited to film and TV shoots, which prefer larger soft light sources. Therefore, it is desirable to convert the small, bright LED light source to create a larger, softer light.

One prior art approach to convert the beam of light that a small bright LED fixture puts out into a large softer source is for technicians to project the beam of light onto a frame larger than the source. Typically, the frame would be covered in diffusion cloth which is often placed 6" to 24" from the light. By doing this the desired larger softer source is created from the smaller, brighter LED fixture. The disadvantage of this approach is that the detached frame is cumbersome and requires extra work for assembly and disassembly. Extra stands, rigging and other gear are required, and another detached moving part is introduced which is not physically connected to the light fixture.

The present invention overcomes these disadvantages by providing a lightweight but strong extension housing device that can be attached to any light fixture typically used in film and television lighting, thereby reducing work, time, and equipment requirement.

BRIEF DESCRIPTION OF THE DRAWINGS

The present invention will be described in further detail in accordance with the following drawings where.

DESCRIPTION OF THE INVENTION

Figure 1:
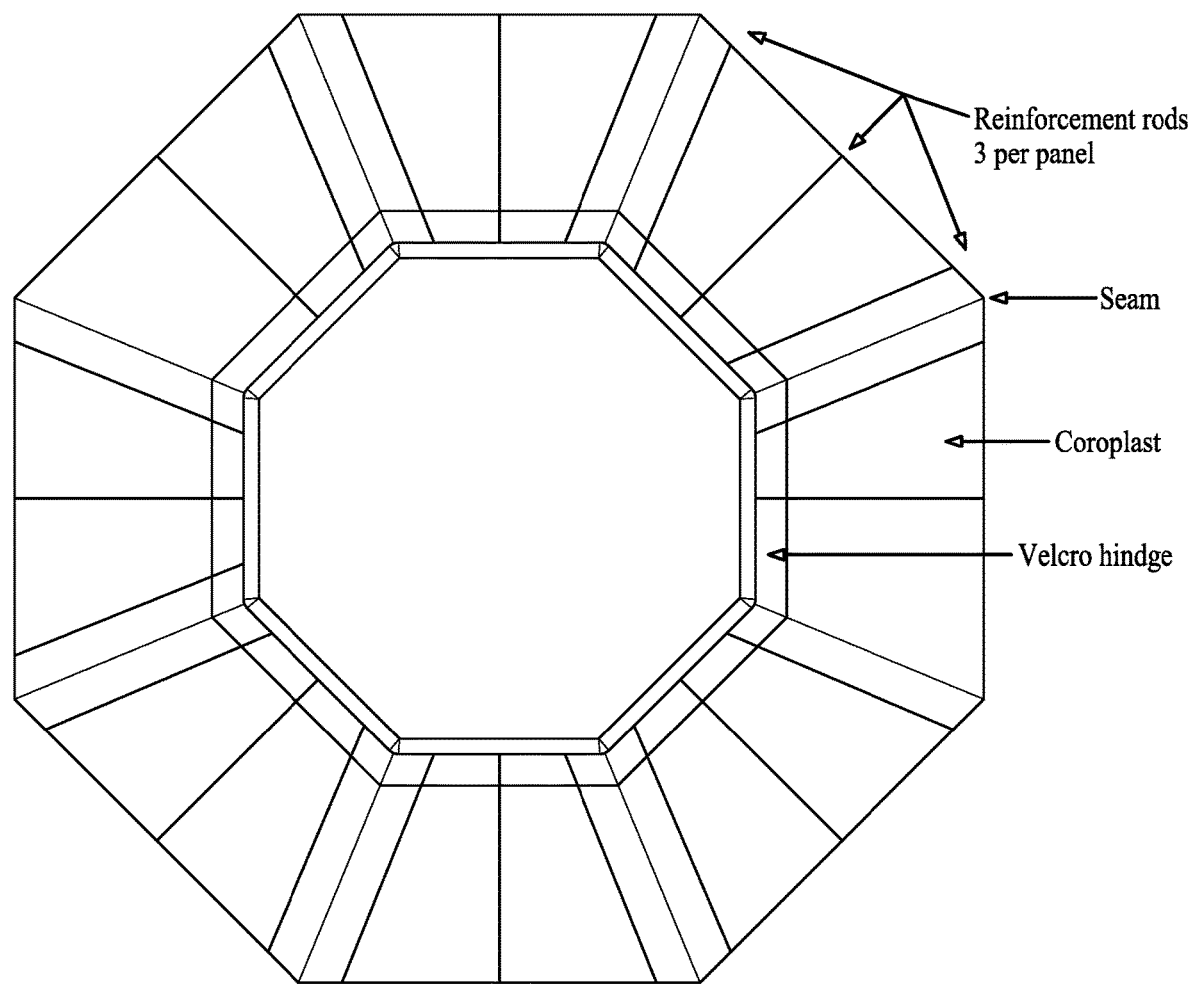
FIG. 1 depicts a top plan view of a first embodiment of the assembled panels of the present invention without the fabric sleeve, with the enclosure flaring outwardly from the light fixture.
Figure 2:
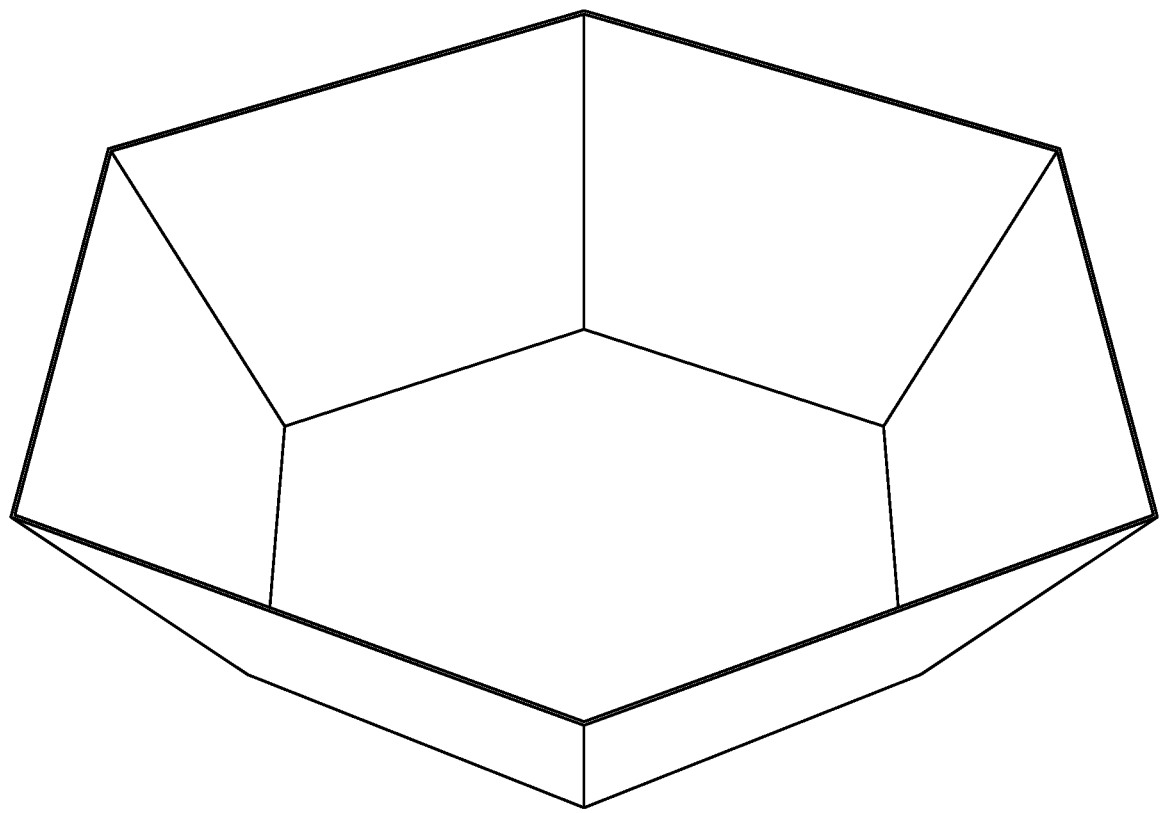
FIG. 2 depicts the assembled panels of the embodiment shown in FIG. 1.
Figure 3:
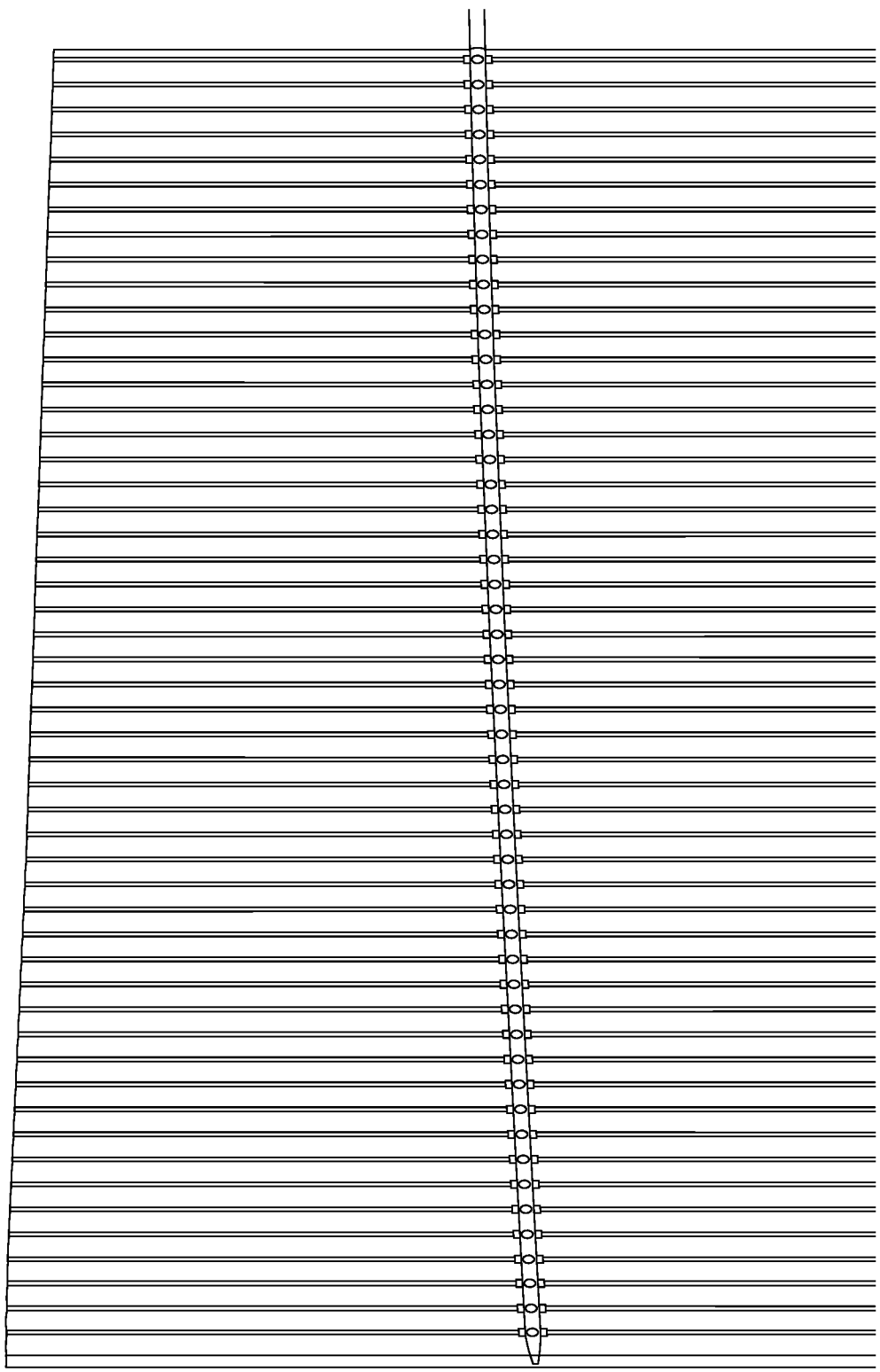
FIG. 3 depicts a single corrugated plastic panel with a fiberglass rod inserted therein.
Figure 4:
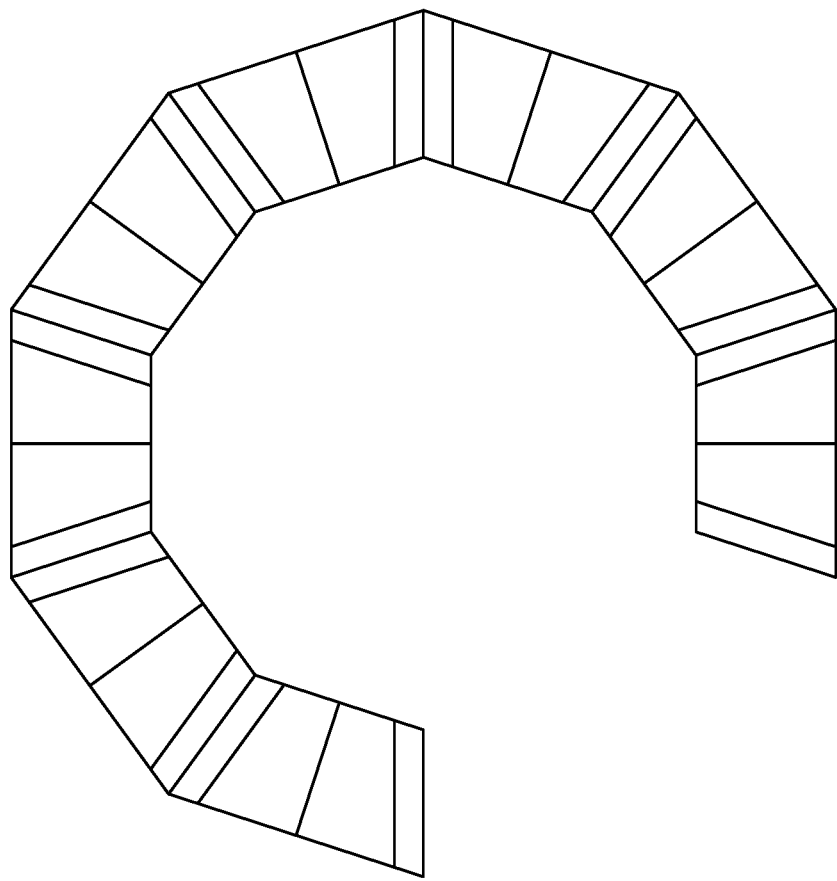
FIG. 4 depicts a string of 8 panels connected end to end.
Figure 5:
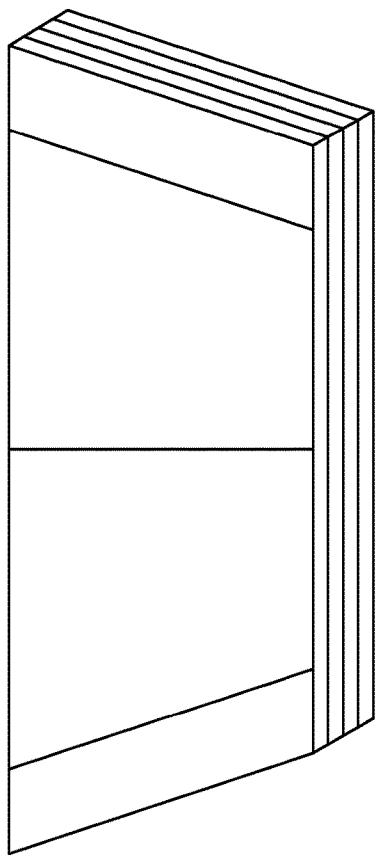
FIG. 5 depicts the device of the present invention folded upon itself for storage and transport.
Figure 6:
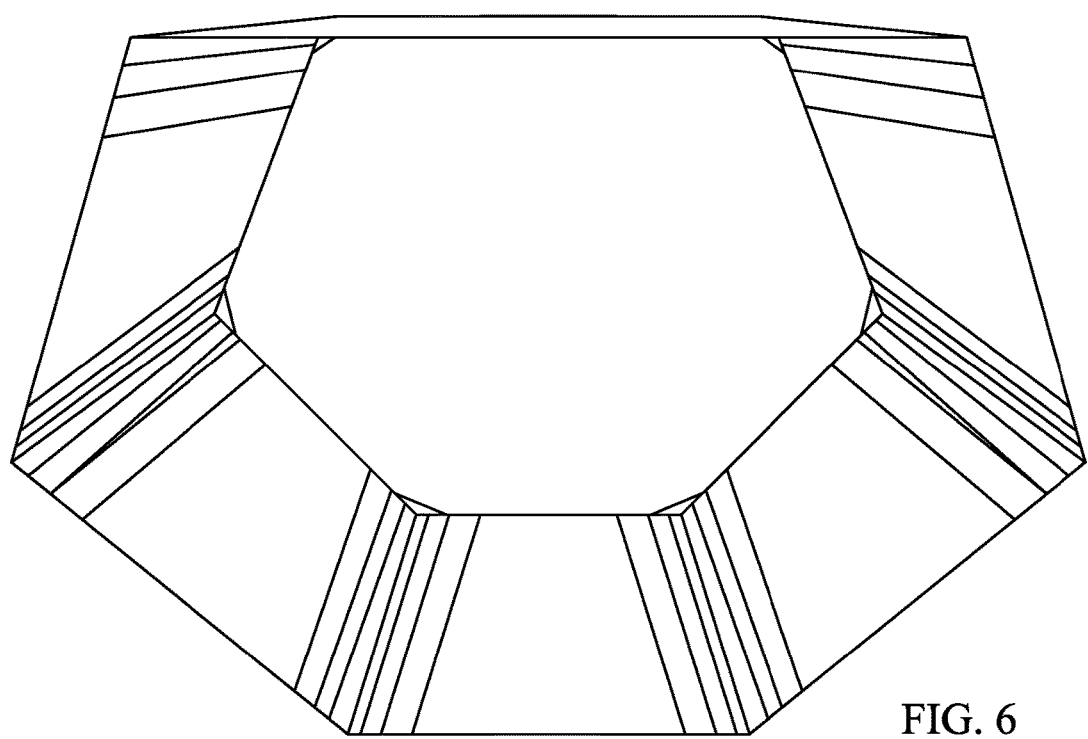
FIG. 6 depicts the device of the present invention without fabric sleeve.
Figure 7:
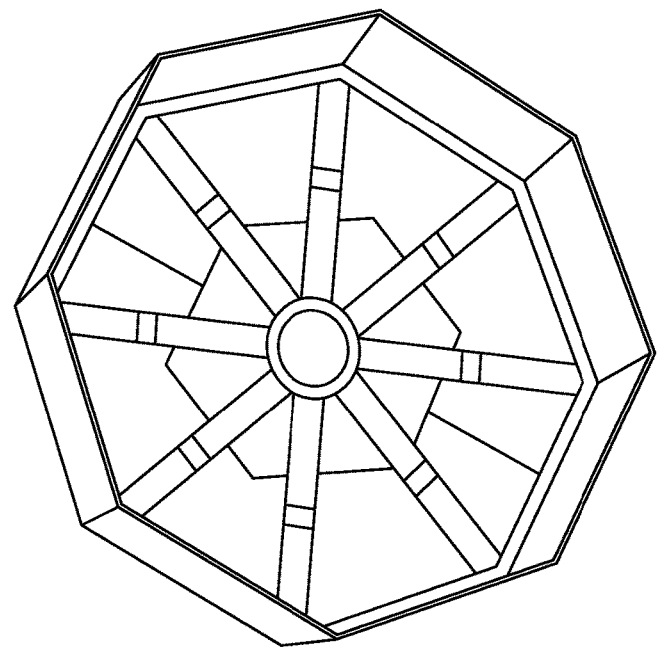
FIG. 7 depicts an alternate embodiment of the invention having rectangular panels attached to a lighting fixture.

The present invention is a lighting device for use as an LED light accessory in film and television production. The invention comprises an extension housing reversibly attachable to a light fixture. In this disclosure, the term "softbox" is used interchangeably with the term "extension housing".

As shown in the figures, the softbox of the present invention comprises a plurality of panels connected to adjacent panels along opposing ends within a fabric sleeve. Each panel preferably is in the shape of an isosceles trapezoid. Other trapezoidal shapes including rectangles are also within the scope of the invention. In a preferred embodiment, the wider edges of the panels are connected to the lighting fixture.

Each panel has a core manufactured of a corrugated plastic material such as COROPLAST™. Several fibreglass rods are inserted through the panels perpendicular to the parallel inner and outer edges of the panels. Preferably one fibreglass rod is to inserted at each of three positions: adjacent a first end, adjacent an opposing second end, and at medial position along the panel.

Along the proximal attachment edge there is provided a hinge having attachment means such as hook and loop fabric for attachment of the device to a lighting fixture.

The device allows the light to better illuminate a diffusion panel by spacing the panel further from the light source while staying connected to the light fixture.

The device may be folded upon itself to about ⅛ of its original size and requires no assembly as it is a single unit. Although the enclosure is collapsible, once it is attached to any light fixture it becomes a rigid frame that does not collapse.

Each fibreglass rod is pressure-fitted into the corrugated plastic panel to add strength, then the assembled, reinforced panels are sewn into a fabric sleeve.

The fabric sleeves are fitted with Velcro strips or other attachment means along the top attachment edge. The device may be attached to any light using Velcro via an adapter frame provided. Most lights would have 4 attaching points for the simple frame. The frame would vary depending on the light fixture.

In a preferred embodiment, the device is provided in an octagonal shape. Other versions included in the invention may be hexagonal or rectangular, including square.

According to another aspect of the present invention, there is provided a light source cover adapter having a similar construction to the softbox of the invention. In a preferred embodiment, the cover adapter is manufactured of selectively shaped panels of corrugated plastic panels hinged to allow folding into a hollow housing corresponding to the rear side of a light source. The panels may be reinforced with fibreglass rods.

Preferably, the leading edges of the cover adapter extend beyond the front edges of the light source. The cover adapter is provided with Velcro strips along its seams to allow assembly, as well as Velcro strips along the leading edges for reversible attachment to the softbox of the invention.

A neoprene patch may be positioned at opposing end panels of the cover adapter to reinforce the point of passage of the light source bracket.

The means of attachment of the softbox of the invention to a light source may be manufactured of various materials, including fabrics, plastics, or metals.

Figure 8:
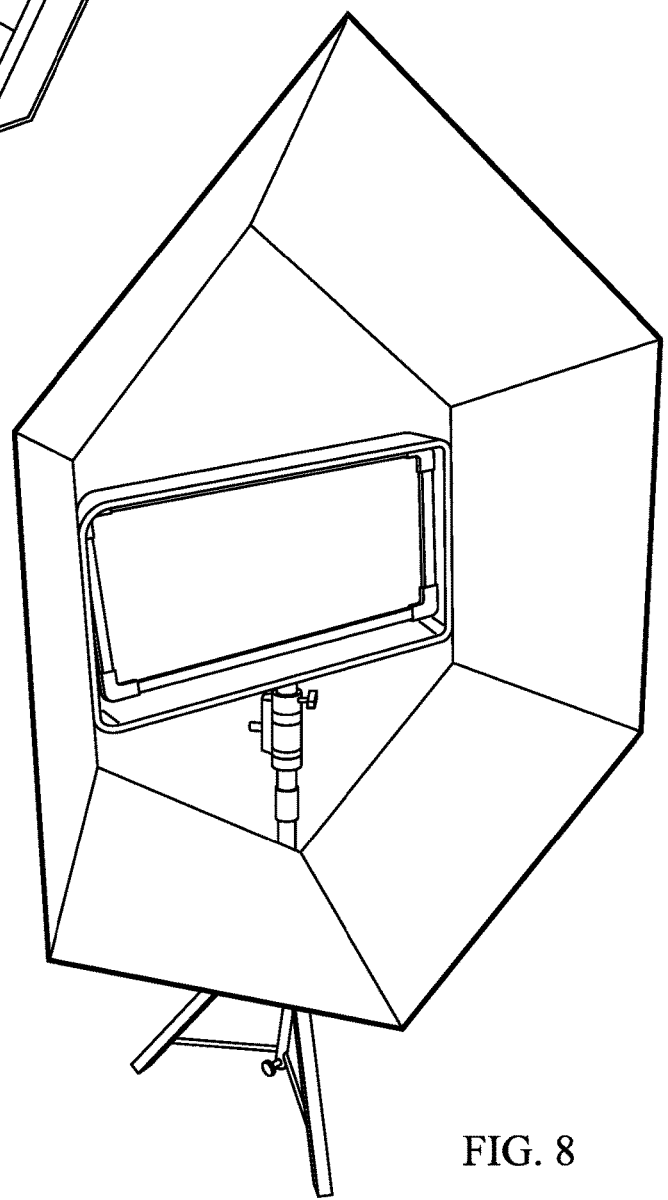
FIG. 8 depicts the hexagonal embodiment of the extension housing of the invention attached to a rectangular light source by the light source cover adapter of the invention.
Figure 9:
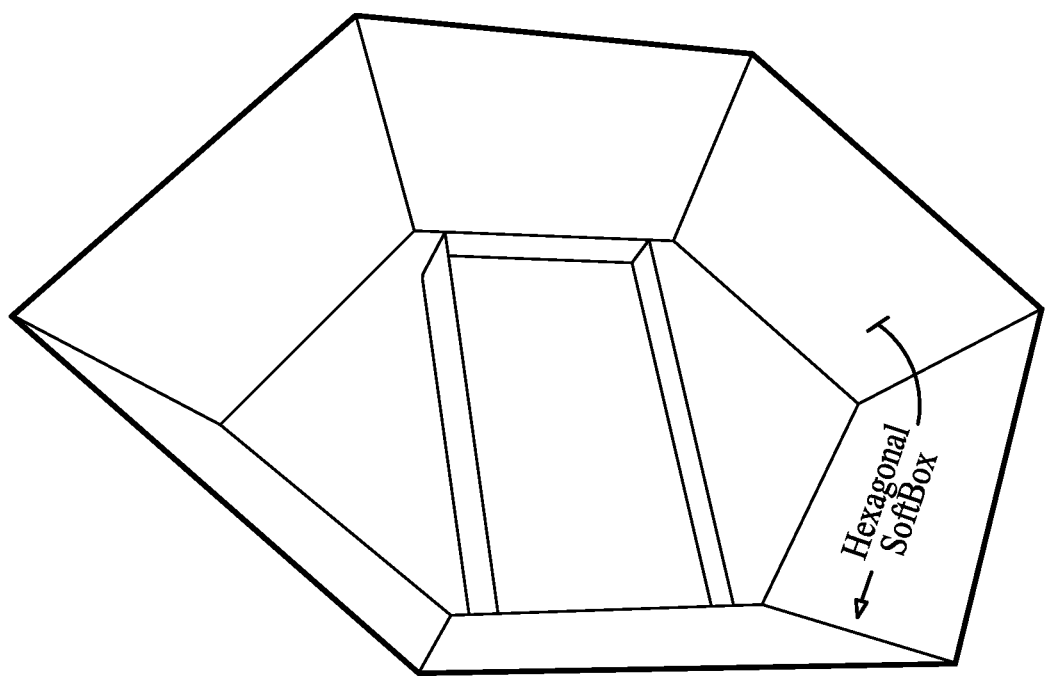
FIG. 9 shows a perspective view of the hexagonal extension housing positioned on a rectangular light source.
Figure 10A:
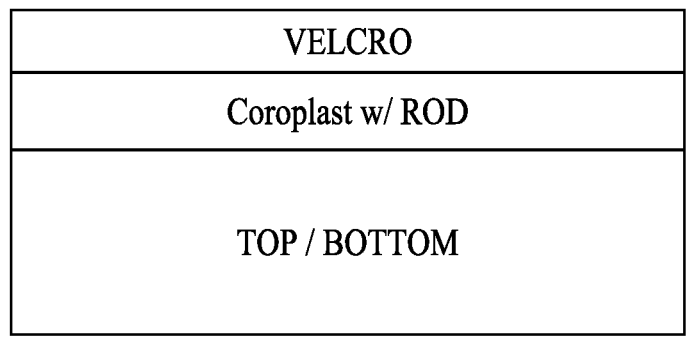
FIGS. 10A, 10B, and 10C depict various plan views of the light source cover adapter of the invention.
Figure 10B:
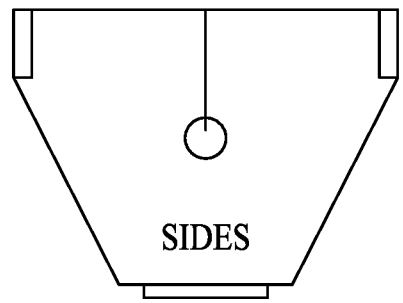
Figure 10C:
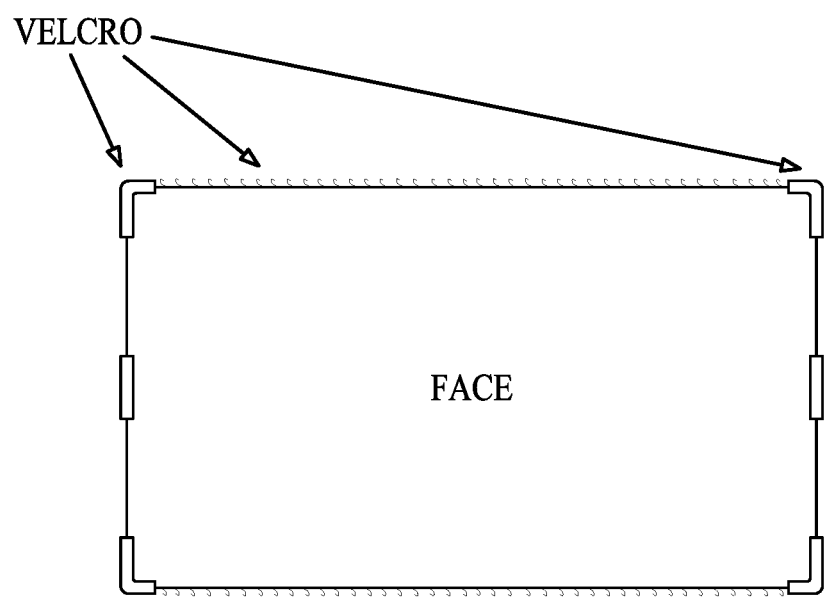
Figure 11:
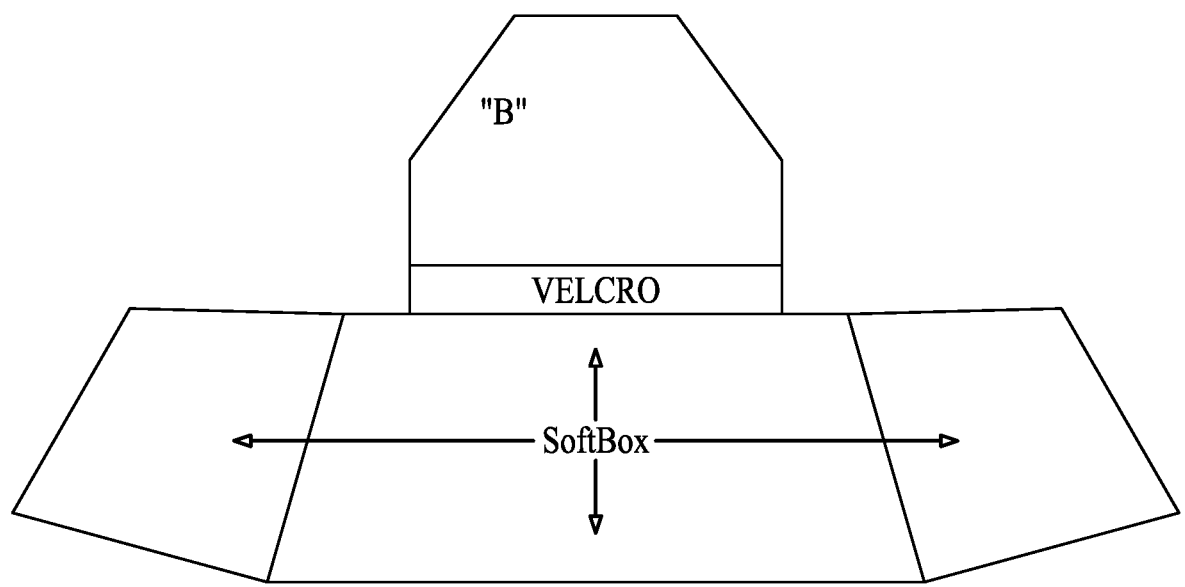
FIG. 11 is a perspective view of the disassembled light source cover adapter of the invention.
Figure 12A:
FIGS. 12A, 12B, and 12C show various views of the assembled light source cover adapter of the invention.
Figure 12B:
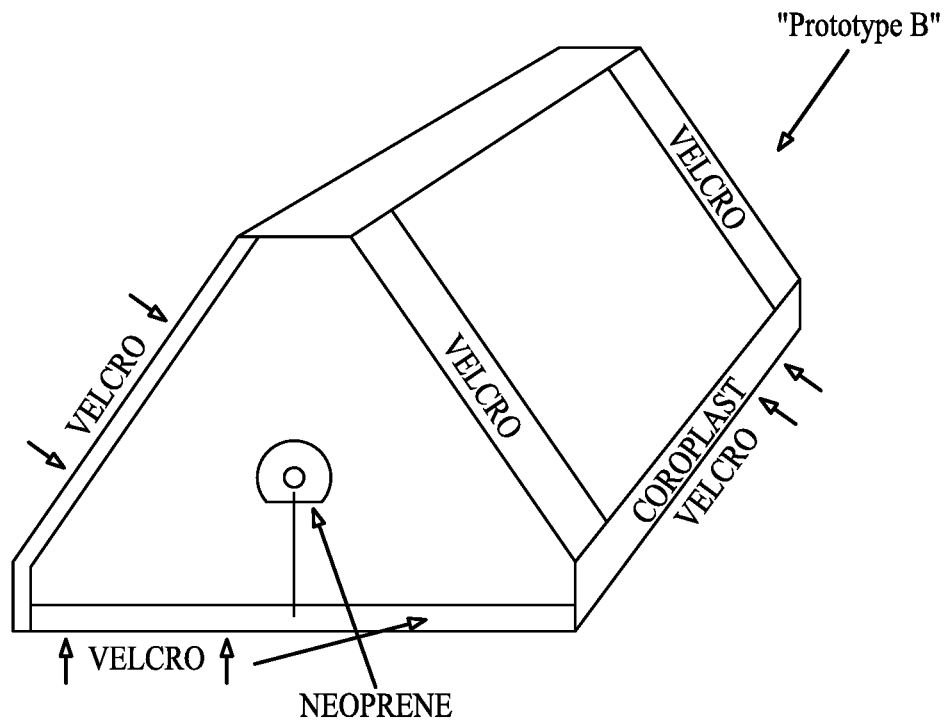
Figure 12C:
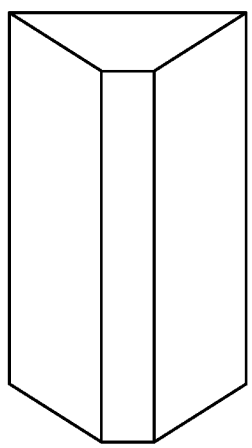
Figure 13A:
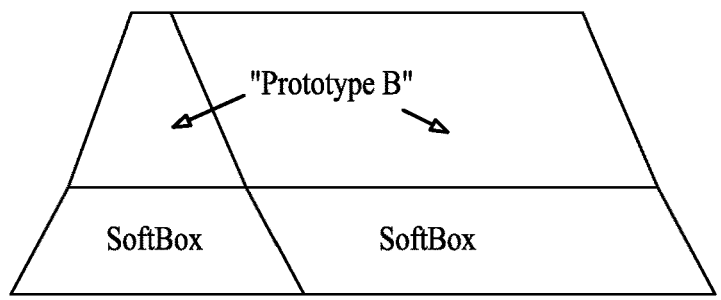
FIGS. 13A, 13B, and 13C show various views of the light source cover adapter attached to a rectangular embodiment of the softbox.
Figure 13B:
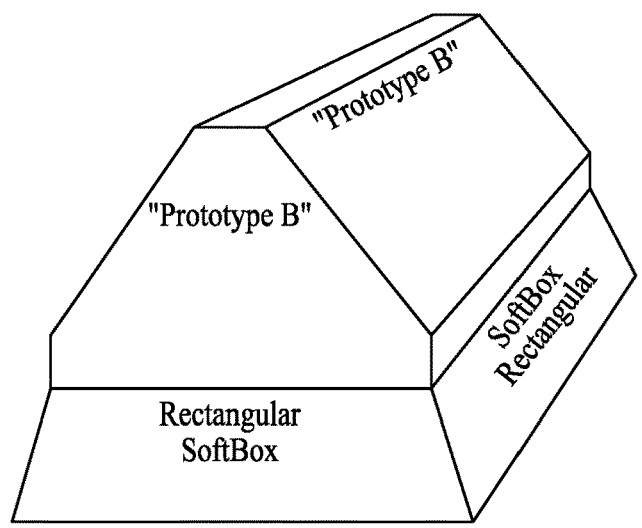
Figure 13C:
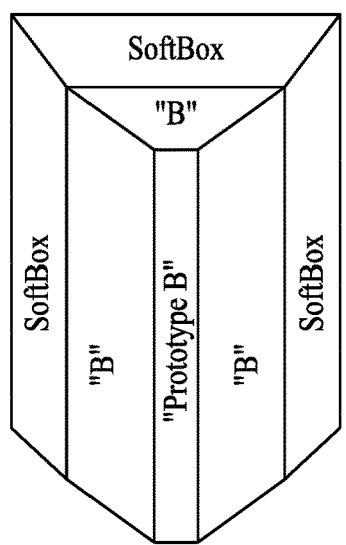
Figure 14:
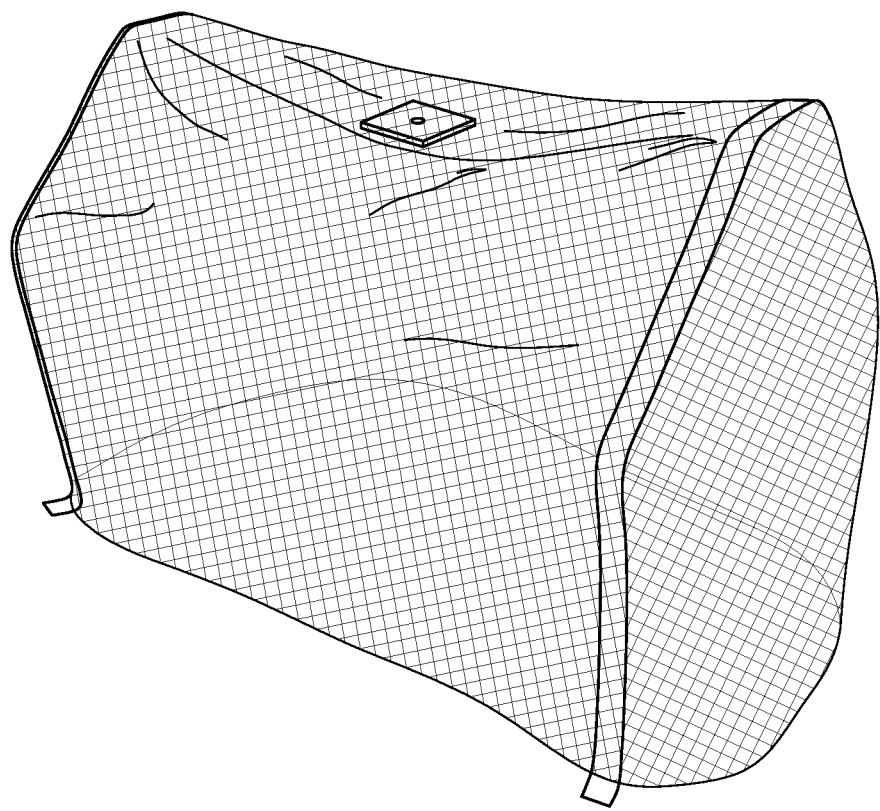
FIG. 14 is a perspective view of the assembled light source cover adapter of the present invention.
Figure 15:
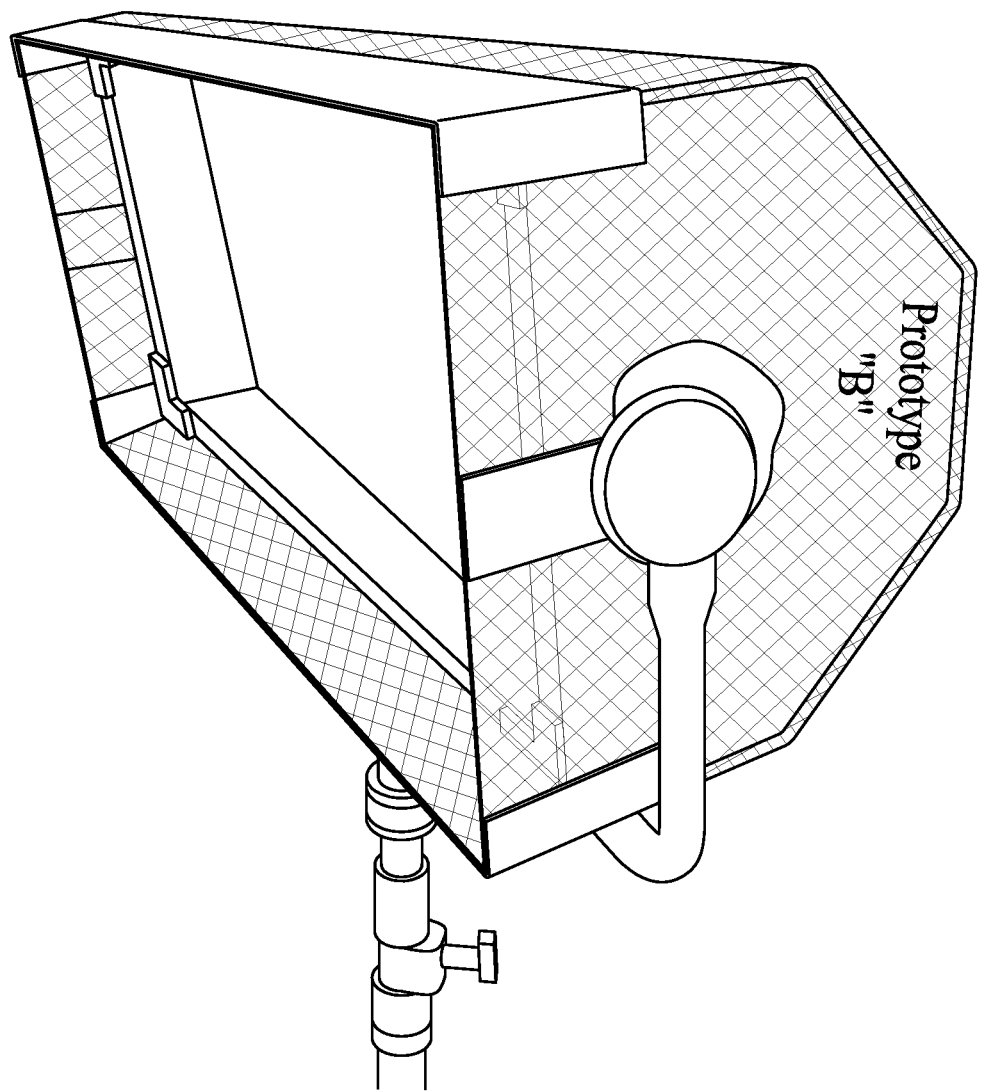
FIG. 15 is a perspective view of the light source cover adapter installed on a rectangular light source.
Figure 16:
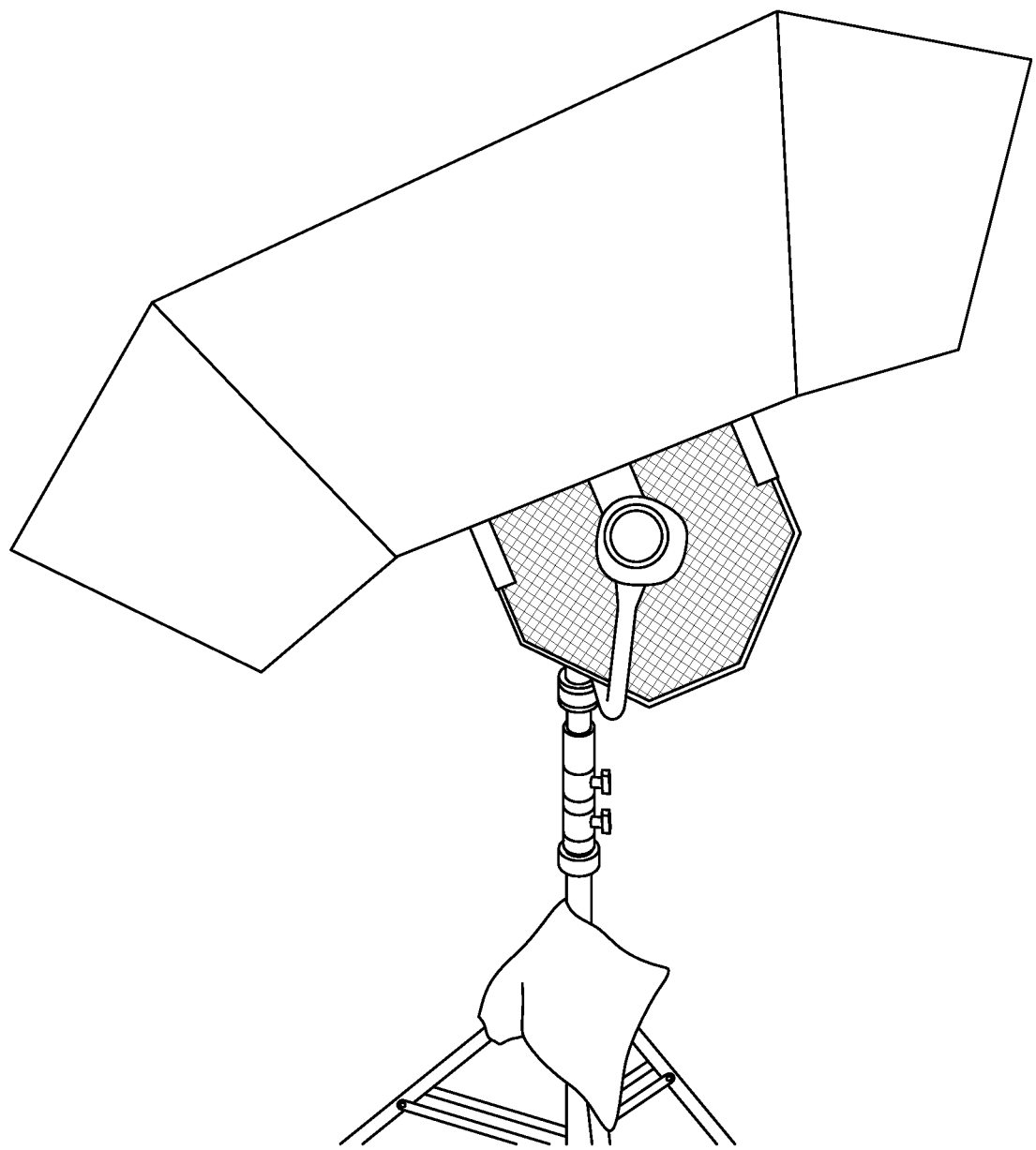
FIG. 16 is a perspective view of a hexagonal softbox of the invention attached to the light source cover adapter of the invention installed on a rectangular light source. Selected embodiments of the invention are illustrated in the drawings by way of citations in the text. It is to be expressly understood that the description and drawings are only for illustration and as an aid to further clarify the descriptive text of the present invention and are not intended to limit the parameters and potential applications of the invention.

As depicted in FIGS. 8, 9, and 16, the cover adapter may be used to attach a hexagonal softbox to a rectangular light source, including a square light source.

It will be appreciated by those skilled in the art that other variations of the preferred embodiment may also be practiced without departing from the scope of the invention.

What is claimed is:

1. A lighting device comprising an extension housing reversibly attachable to a light fixture, the extension housing further comprising a plurality of panels connected along adjacent longitudinal edges, the assembled panels forming a proximal edge and a distal edge, wherein each panel is an isosceles trapezoid and comprises a corrugated plastic core with one or more fiberglass rods inserted through the plastic core.

2. The lighting device of claim 1, wherein each of the fiberglass rods is inserted parallel to the parallel edges of the panels.

* * * * *